United States Patent [19]

Deplano

[11] Patent Number: 5,150,451
[45] Date of Patent: Sep. 22, 1992

[54] EQUIPMENT AND METHOD FOR CONTROLLING THE OPERATION OF A LINE OF MACHINES, PARTICULARLY PRESSES

[75] Inventor: Stefano Deplano, Turin, Italy

[73] Assignee: Comau S.p.A., Turin, Italy

[21] Appl. No.: 628,779

[22] Filed: Dec. 17, 1990

[30] Foreign Application Priority Data

Dec. 20, 1989 [IT] Italy .............................. 68135-A/89

[51] Int. Cl.$^5$ ..................... G05B 19/42; G06F 15/46
[52] U.S. Cl. ........................................ 395/83; 395/82; 901/46; 29/783
[58] Field of Search ................. 395/82, 83; 901/46; 29/783

[56] References Cited

U.S. PATENT DOCUMENTS

| | | | |
|---|---|---|---|
| 4,870,592 | 9/1989 | Lampi et al. ........................ | 395/83 |
| 4,894,908 | 1/1990 | Haba, Jr. et al. ................... | 29/783 |
| 4,990,839 | 2/1991 | Schonlau ............................. | 395/83 |
| 5,019,762 | 5/1991 | Kato .................................... | 395/83 |

*Primary Examiner*—Allen R. MacDonald
*Assistant Examiner*—George Davis
*Attorney, Agent, or Firm*—Armstrong & Kubovcik

[57] ABSTRACT

In a line of presses, the pieces are transferred from one press to another by means of a plurality of programmable manipulator robots interposed between the presses. The operating cycles of the manipulator robots are synchronised with those of the presses on the basis of the operating frequency of the first press at the input of the line, the operating cycles of the various machines in the line being derived from each other in a cascade process starting from the basic operating frequency.

6 Claims, 4 Drawing Sheets

EQUIPMENT AND METHOD FOR CONTROLLING THE OPERATION OF A LINE OF MACHINES, PARTICULARLY PRESSES

BACKGROUND OF THE INVENTION

1. Field of the Invention

The present invention relates to equipment and a method for controlling the operation of a line of machines, particularly presses, which are intended to perform a succession of operations on pieces which are advanced along the line, the line also including a plurality of programmable manipulator robots interposed between the machines for transferring the pieces from one machine to another, each machine having a device which is movable between an operative position for carrying out a certain operation on a piece situated in the machine and an inoperative position in which a piece to be worked can be deposited in the machine or a piece worked by the machine can be picked up; each manipulator robot including a gripping member which is movable between a first position in which it can grip a piece situated in the machine immediately upstream of the robot and a second position in which it can deposit the piece it has gripped in the machine immediately downstream of the robot.

Lines of the type indicated above are used in particular in the automotive industry for the manufacture of pressed sheet-metal motor-vehicle-bodywork components. Each sheet-metal element is subjected to a series of drawing, blanking and perforating operations, etc. until the finished piece is produced.

2. Description of the Prior Art

For some time Applicant has produced and sold a programmable manipulator robot which is particularly advantageous for transferring pieces from one press to another in a line of presses of the type indicated above. This manipulator robot is described and illustrated in Italian Utility Model IT-U-0 195 537, in the corresponding German Patent Application DE-A-3 445 003, in the corresponding French Patent Application FR-A-2 556 274 and in the corresponding U.S. Pat. No. 4,661,040.

The use of robots in lines of the aforesaid type obviously provides the advantage that the line has considerable flexibility which enables it to be adapted quickly and easily to new production requirements.

Before the use of robots, the conventional technique used was that of so-called transfer lines in which all the machines in the line worked in synchronism and the various pieces situated in the line were advanced simultaneously by one step along the line during the interval between two successive stages in which the machines in the line were active. The introduction of robots as the means for transferring the pieces from one press to another, as indicated above, has provided flexible lines but, at the same time, has lead to the asynchronous operation of the various machines in the line. In other words, in press lines with robots between the presses, each machine forming part of the line (presses, robots, piece-loaders upstream of the line and piece-unloaders downstream of the line) has an operating cycle which is not perfectly linked to the operating cycles of the other machines. In order for the line to operate normally, the robots must, therefore, also fulfil a regulatory function by pausing in their travels between one press and another when necessary. As a result, the operating cycles of the robots are generally uneven, with frequent stops and consequent decelerations and accelerations. The rate of operation of the line is not well defined since it is subject to variations caused by the variations in the cycles of the individual machines over a period of time or by phenomena of instability and lack of synchronisation.

SUMMARY OF THE INVENTION

The object of the present invention is to provide equipment and a method for controlling the operation of a line of the type indicated at the beginning of the present description which avoids the disadvantages cited above.

The equipment according to the invention is characterised mainly in that it comprises:

control means for the first machine in the line which are arranged to cause a cyclic movement of the movable device of the first machine between its inoperative position and its operative position at a predetermined, basic cycle frequency, which will govern the operating cycles of all the rest of the machines and of all the robots of the line in cascade, sensor means associated with the first machine and with each subsequent machine in the line for emitting a signal each time the respective machine is at a predetermined point in its cycle, control means associated with each manipulator robot in the line for starting the respective manipulator robot as a result of the emission of the signal by the sensor means associated with the machine immediately upstream of the manipulator robot, causing the gripping member of the manipulator robot to move cyclically from a rest position to the first position, from the first position to the second position and from the second position back to the rest position in an operating cycle which is in phase with the operating cycle of the machine immediately upstream of the manipulator robot, sensor means associated with each manipulator robot in the line for emitting a signal each time the gripping member of the respective robot is at a predetermined point in its cycle, and control means associated with each machine downstream of the first machine in the line for starting a cyclic movement of the movable device of the respective machine between its operative position and its inoperative position as a result of the emission of the signal by the sensor means associated with the manipulator robot which is immediately upstream of the machine, so that the operating cycle of each machine downstream of the first machine of the line is in phase with the operating cycle of the manipulator robot situated immediately upstream.

In other words, the operating cycles of the machines and of the robots in the line are synchronised, the operating cycle of the first machine at the input of the line being taken as a reference and the cycles of the remaining machines and of the robots being obtained from one another in a cascade process, starting from the cycle of the first machine.

When the line is in operation, the equipment according to the invention enables the various machines in the line and the robots interposed between them to operate with regular and synchronised operating cycles. In particular, each operating cycle of each robot comprises an outward movement from its initial rest position towards the press situated upstream of the robot, a stage in which the piece worked in the machine situated upstream is gripped, a return movement in which the worked piece in transported to the machine downstream, a stage in which the piece is deposited in the machine situated downstream and a final movement to its initial rest position. During this operating cycle, the robot does not make any further stops in addition to that at the rest position at the beginning and at the end of the cycle. In other words, each time the gripping member of the robot approaches the machine upstream to pick up a piece, or the machine situated downstream to deposit a piece, the equipment ensures that the machines are not in their operative conditions so that the robot is not forced to interrupt its cycle in order to avoid collisions.

Similarly, the equipment also ensures that each time a robot works at a machine, it does not collide with the robot upstream or downstream respectively.

A further subject of the invention is a method of controlling the line which is carried out by means of the aforementioned equipment.

BRIEF DESCRIPTION OF THE DRAWINGS

The invention will now be described with reference to the appended drawings, provided purely by way of non-limiting example, in which.

DESCRIPTION OF THE PREFERRED EMBODIMENTS

Figure 1:
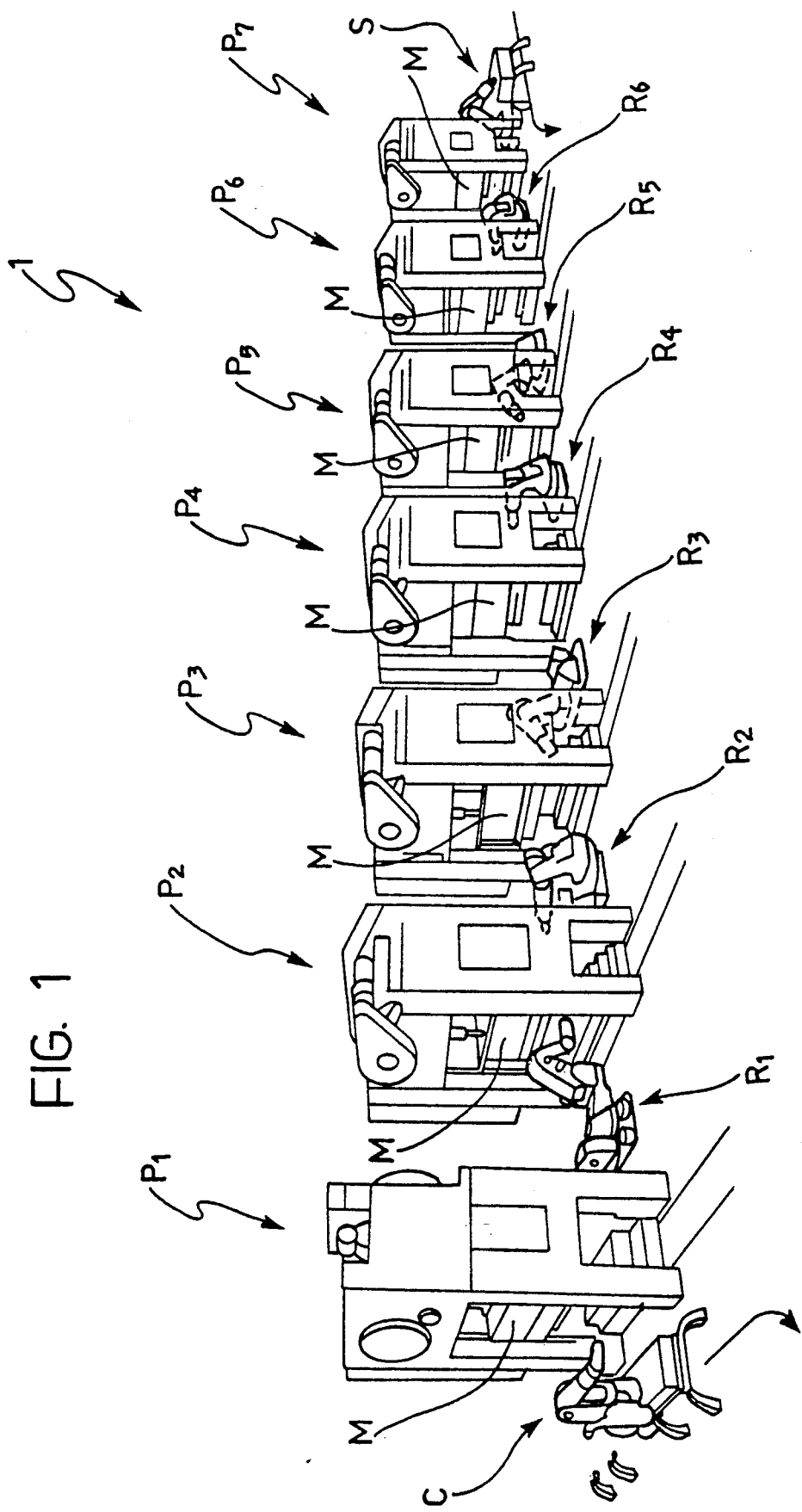
FIG. 1 is a perspective view of a line of presses in which a plurality of robots are used between the presses.
Figure 2:
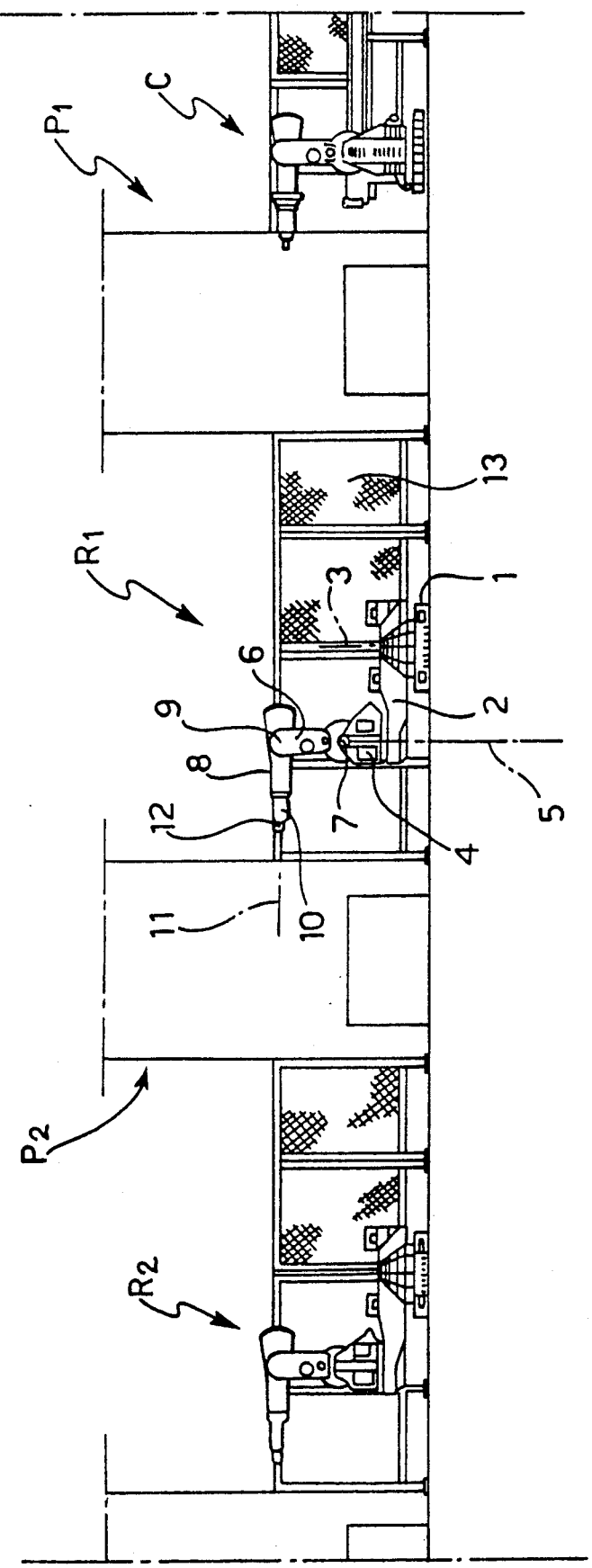
FIG. 2 is a partial elevation of the line of FIG. 1.

FIGS. 1 and 2 show a line of presses P1, P2, P3, P4, P5, P6, and P7, generally indicated 1, which will carry out a succession of drawing, blanking and perforating operations, etc. on sheet-metal elements which are advanced along the line in order to produce motor-vehicle bodywork components. The line includes a plurality of robots R1, R2, R3, R4, R5, and R6 between the presses for transferring the pieces from one press to another. The structures of the presses P1-P7 are not described in detail since these structures may be of any known type and do not fall within the scope of the present invention. For the purposes of an understanding of the invention, however, it is important to mention the fact that each press includes a movable device M which is movable vertically between an inoperative, raised position and an operative, lowered position. Obviously, however, the invention can also be applied to lines of machines other than the presses.

The robots R1-R6 shown between the presses in the appended drawings are of the type which is the subject of Italian Utility Model No. IT-U-0 195 537 and the corresponding foreign patent documents mentioned above. The structure of the robot is not described in detail herein since it does not fall within the scope of the present invention and, moreover, because the invention also applies to lines which use robots with different structures. A brief description of the robot which forms the subject of the patent documents mentioned above and which is used between the presses is provided here solely to enable the description which follows to be understood. With reference to FIG. 2, each robot R1-R6 comprises a fixed base structure 1 situated at a point intermediate two successive presses, a support platform 2 mounted on the base structure 1 for rotation about a vertical axis 3, a lower body 4 mounted on the base platform 2 for rotation about a vertical axis 5 spaced from the axis 3, a forearm 6 articulated to the lower body 4 about a horizontal axis 7, an arm 8 articulated to the forearm 6 about a horizontal axis 9 and a terminal part 10 mounted on the end of the arm 8 for rotation about the longitudinal axis 11 of the arm and having an articulated wrist 12 carrying a piece-gripping member of any known type, for example, of the type with suction cups (not shown). For safety reasons, the region between each pair of successive presses, in which a respective robot works, is protected by railings 13.

Finally, the line shown in FIGS. 1 and 2 includes a loading robot C and an unloading robot S upstream and downstream of the line respectively. The structures of the robots C, S are likewise not described below since they may be of any known type and do not fall within the scope of the present invention.

Figure 3:
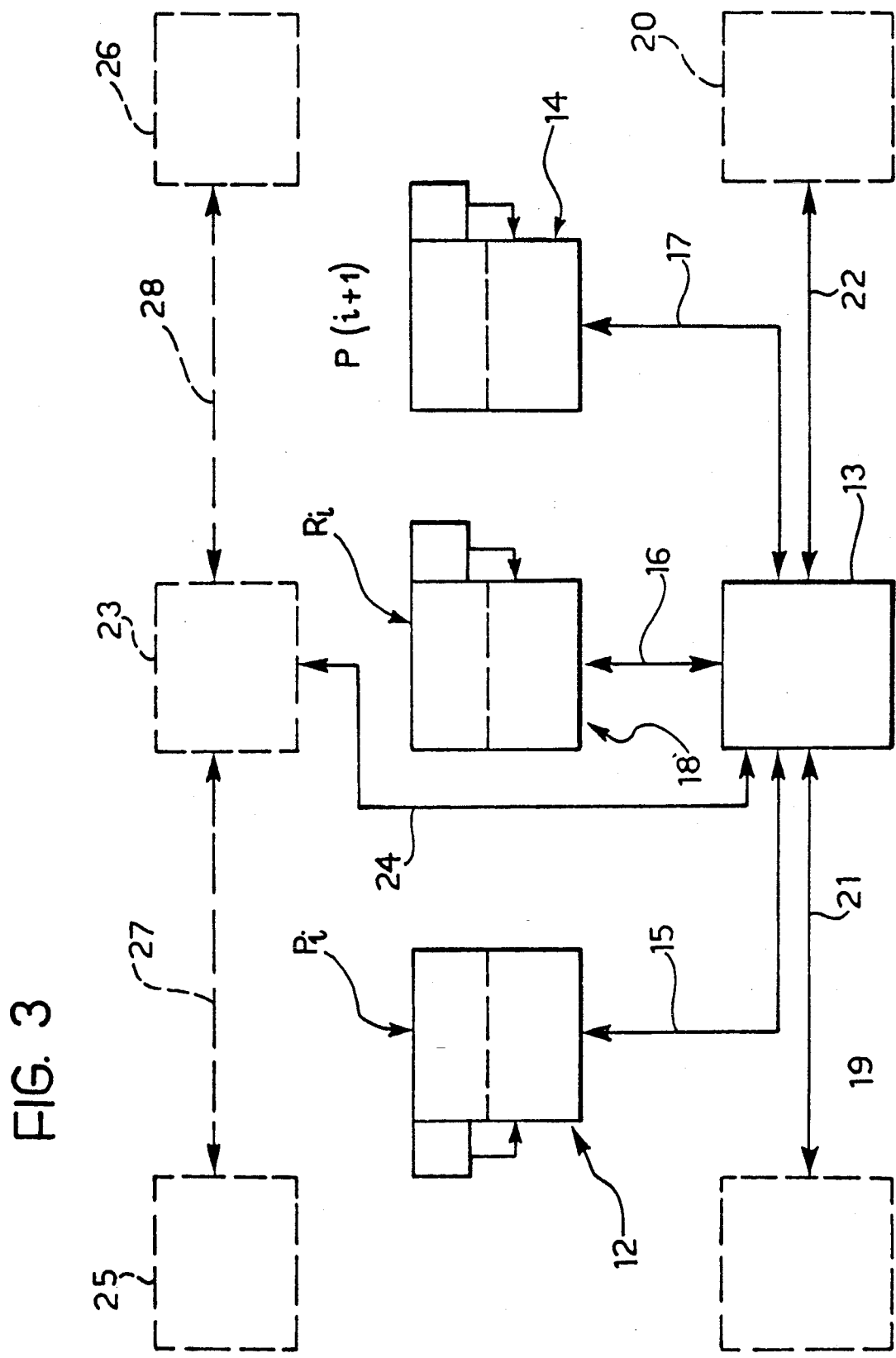
FIG. 3 is a block diagram showing the equipment according to the invention.

FIG. 3 of the appended drawings shows schematically the equipment according to the invention with reference to a station of the line 1, that is, a portion of the line 1 including a between-press robot Ri, the press Pi situated immediately upstream of the robot Ri and the press P(i+1) situated immediately downstream of the robot.

In known manner, each of the two presses and the robot has a respective on-board programmable logic control (PLC) indicated 12, 13 and 14 respectively for the upstream press, for the robot, and for the downstream press. The PLCs 12, 13, 14 govern the presses and the robot.

The robot also has a movement control system (MCS) constituted by a processor which can exchange data with the PLC 13 through the line. The PLC 13 can exchange data with similar robot PLCs 19, 20 of the stations situated upstream and downstream through input-output lines 21, 22. The robot PLC 13 also exchanges data with a control PLC of the station 23 by means of an input-output line 24 and with the PLCs 12, 14 by means of input/output lines 15, 17. The PLC 23 can exchange data with similar PLCs 25, 26 of the upstream and downstream stations through input-output lines 27, 28.

Sensor means SP are associated with each press for emitting a signal when the movable device of the press is situated at one or more predetermined points in its cycle of reciprocating movement as will be described in more detail below. The sensor means may be of any known type. They may, for example, be constituted by mechanical sensor means adapted to cooperate with a movable part whose movement is linked to the movement of the movable device of the press. Alternatively, they may be constituted by electronic sensor means, for example for detecting the angular position of a rotary shaft which drives the movable device of the press.

As another alternative, the means could be constituted by a sensor for detecting a parameter whose value is linked to the operating cycle of the press (for example a time, a temperature, etc.). The sensor means are not described in detail below since they have a known structure which does not fall within the scope of the present invention. Moreover, the elimination of these details from the drawings and from the description makes the latter more easily and readily understood.

Sensor means SR, of the type indicated above, are also associated with the robot for detecting when the piece-gripping member carried by the wrist 12 of the robot is situated in one or more predetermined positions of its cycle of movement.

The various devices shown in FIG. 3 are arranged to carry out a sequence of steps which is described in detail below with reference to FIG. 4.

In the particular embodiment illustrated, when each robot is inoperative, it is in a waiting position (see FIG. 2) facing the downstream press. When a given robot is brought into operation, it moves from this rest position to a first position which corresponds to the picking-up of a piece from the press upstream, then from the first position to a second position which corresponds to the deposition of the piece picked up in the press downstream, and then from the second position back to the rest position. This succession of movements is repeated cyclically, the robot stopping in the rest position for a predetermined time between one cycle and the next. As regards the presses in the line, however, when the line is running the movable device of each press moves cyclically between its inoperative, raised position and its operative, lowered position without pauses, except in the event of an emergency.

Figure 4:
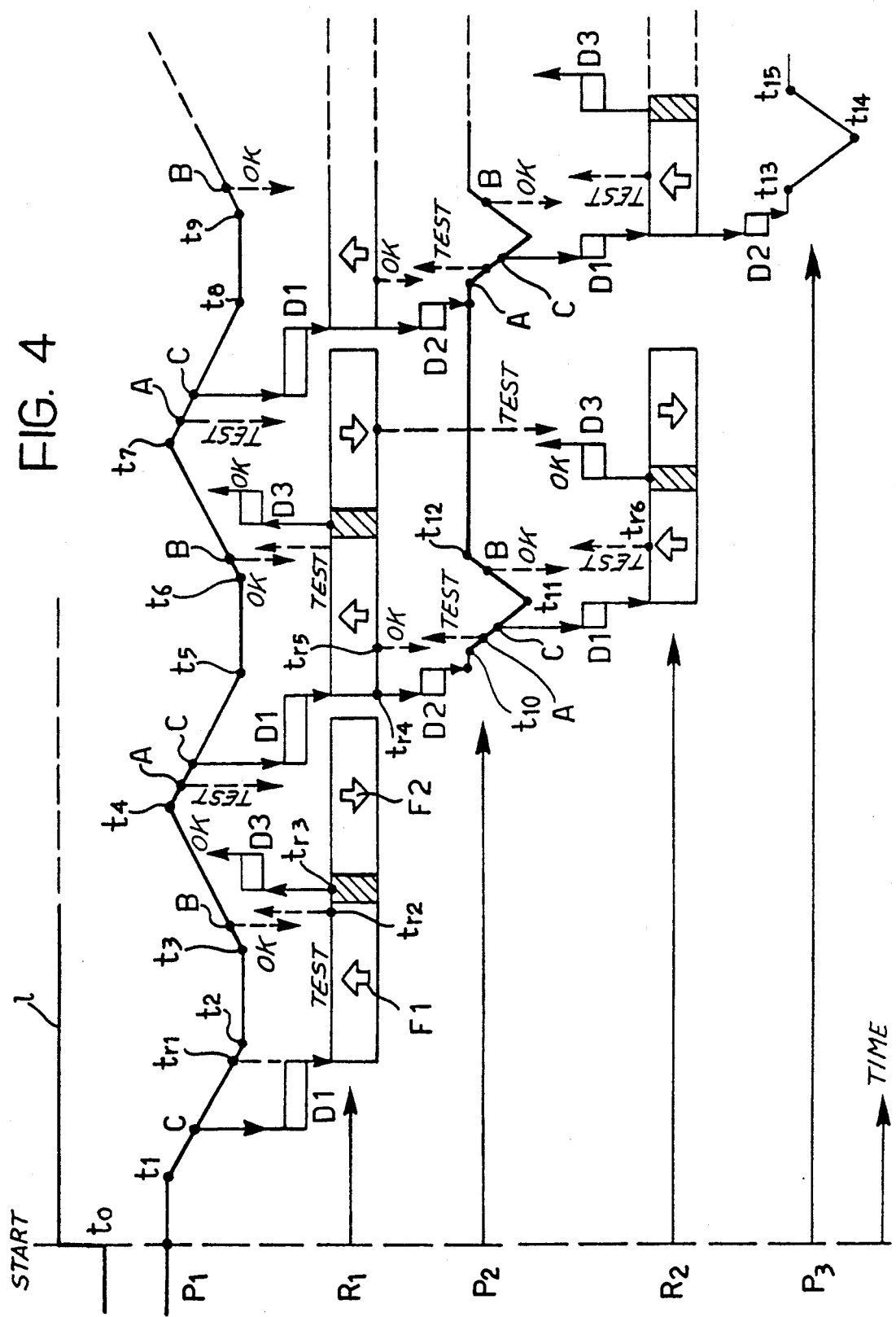
FIG. 4 is a graph showing the operating principle of the equipment according to the invention.

FIG. 4 of the appended drawings shows a graph representing the operating cycles of the presses P1, P2 and P3 and of the robots R1 and R2 in the line, the operation of the remaining presses and robots in the line being deducible from the following description with reference to the graphs illustrated.

In FIG. 4, the line 1 shown at the top represents a starting or start signal for the first press P1 in the line. At the instant $t_0$, this signal causes the press P1 to start. The operating cycle of the press is illustrated by the second line from the top in FIG. 4. In the embodiment illustrated, the press P1 is of the type in which the movable device comprises a sheet hold-down appliance which is movable between a raised, inoperative position and a lowered, operative position and a punch which travels with the hold-down appliance along the portion of its path between the inoperative position and the operative position of the hold-down appliance, after which the punch can descend further to effect the drawing of a sheet-metal panel arranged in the press. With reference to the graph of FIG. 4, after the start signal has been given at the instant $t_0$, the movable device of the press P1, comprising the punch and the hold-down appliance starts to descend from the inoperative raised position at the instant $t_1$. At the instant $t_2$, the hold-down appliance has reached its lowered, operative position. After this instant the punch continues to descend until it reaches its operative, lowered position, which occurs at the instant $t_3$. After this instant, the movable device returns upwardly until it reaches its inoperative, raised position at the instant $t_4$, after which the cycle is repeated in an identical manner.

According to the present invention, once the start signal has been given at the instant $t_0$, the PLC 12 of the first press P1 in the line causes the device of that press to move cyclically with a predetermined, basic cycle frequency which is intended to govern the operating cycles of all the remaining presses and of all the robots in the line. In other words, the rate of operation of the first press P1 in the line is used as a reference or "clock" for the whole line. Naturally, the rates of operation of all the machines in the line, are taken into account in the selection of this rate of operation so that it is not slower than any of them.

The start signal for the robot R1 situated immediately downstream of the press P1 is generated with reference to a predetermined point in the cycle of the press P1. More particularly, the signal which starts the robot R1 is given in correspondence with a point C in the cycle of the press P1. When the sensor means SP associated with the press P1 detect that the cycle of the press has reached the point C, they emit a signal which is received by the PLC 12 of the press and transmitted thereby to the robot PLC 13 (FIG. 3) which starts the robot R1 after a delay D1 (FIG. 4) from the instant at which the cycle of the press passes through the point C.

With reference to FIG. 4, the robot R1 is started at the instant $t_{r1}$. At this instant, the robot is in its rest position facing the press P2. During a first stage in its cycle, the gripping member of the robot moves towards the press P1 (as shown symbolically by the arrow F1 in FIG. 4). The robot thus reaches its first position, in correspondence with the press P1, where it can pick up a worked piece (that part of the graph of the cycle of R1 shown by a broken line) after which it moves towards its second position (arrow F2) and thence back to its rest position, where it stops. The point C in the cycle of the press P1, at which the press calls on the robot R1, is selected so that, when the robot reaches the press P1, the press is sure to be open and the robot can pick up the piece worked thereby without the need for intermediate stops. In order to take account of possible emergency situations, in each case an OK signal, that is a signal for enabling the robot R1 to enter the press, is generated at a point B in the cycle of the press P1 (the reaching of which is indicated by the sensor means SP). Again for safety reasons, the robot R1 carries out a check with the press P1 at an instant $t_{r2}$, as shown schematically by the broken arrow of FIG. 4, to confirm that the press is open. This check is carried out by the robot PLC through the input-output lines 15, 16.

At an instant $t_{r3}$ at which the robot reaches its working position at the press P1, another signal is generated which, after a delay D3, gives rise to an OK, or enabling, signal for the loading of a new piece into the press P1. Again, for the same reason, the press carries out a check with the robot at a point A in the cycle of the press P1, which is reached after the instant $t_4$, to confirm that the robot has moved away from its working position at the press. After the point A in the cycle has been reached, the steps described above are repeated cyclically.

At the start of the second cycle of the robot R1, at the instant indicated $t_{r4}$, the sensor means SR generate a signal which starts a second press P2 in the line after a delay D2. This press is of the type including a single striking hammer which can be moved between a first, inoperative, raised position and an operative, lowered position. At the instant $t_{10}$, the striking mass starts to descend, its operative, lowered position being reached at the instant $t_{11}$, after which the striking mass rises again until it reaches its inoperative, raised position at the instant $t_{12}$. At an instant $t_{r5}$, the sensor means SR associated with the robot R1 generate an enabling signal for the operation of the press P2 which ensures that the robot R1 has moved away from its operating position at the press P2 when the movable device of that press is lowered. At an instant after the instant $t_{10}$, the press in turn carries out a check with the robot R1 in order to verify that the robot has moved away. At a point C in the cycle of the press P2, the reaching of which is detected by the sensor means SP associated with that press, a signal is generated which starts the robot R2 situated downstream of the press P2 after a delay D1. At a point B in a cycle of the press P2, the press gives a signal for enabling the operation of the robot R2, which ensures that the press is open when the robot reaches its working position at the press P2. The robot R2 in turn carries out a check with the press P2 at a instant $T_{r6}$ to confirm that the press is open. When it reaches its working position at the press upstream, the robot R2 also generates a signal which, with a delay D3, gives the OK to the robot R1 to ensure that there cannot be a collision between the robots R1 and R2 at the press P2. For the same reason, the robot R1 makes a check with the robot R2 (which is affected by means of an exchange of data between the MCS processors associated with the robots) to confirm that the robot R2 has moved away from the press P2 when the robot R1 is about to arrive at that press.

In a similar manner to that described above, the robot R2 emits a signal at the start of its second cycle to start the press P3 after a delay D2. The operating cycle of this press is used as a reference for the operating cycle of the robot R3 and so on, in a cascade process, until all the robots and all the presses in the line are covered.

Any anomaly at a station is communicated by the PLC 23 to the other station PLCs in order to stop the line if necessary.

Naturally, the principle of the invention remaining the same, the details of construction and forms of embodiment may be varied widely with respect to those described and illustrated purely by way of example, without thereby departing from the scope of the present invention.

What is claimed is:

1. Equipment for controlling operation of a line including a plurality of machines, particularly presses, which are intended to perform a succession of operations on individual pieces which are advanced along the line from an upstream machine to a machine immediately downstream thereof, the line also including a plurality of programmable manipulator robots interposed between each upstream machine and the machine immediately downstream for transferring each of said pieces from said upstream machine to said machine immediately downstream, such that each said robot is immediately downstream of its upstream machine and immediately upstream of its machine immediately downstream, each of said machines having a movable device in combination therewith which is movable in an operating cycle of the machine combined therewith between an operative position for carrying out a certain operation on each of said pieces arranged in said machine and an inoperative position in which each of said pieces can be deposited in said machine or can be removed therefrom; each said robot including a gripping member which is movable between a first position in which it can grip a piece situated in a machine immediately upstream of the robot and a second position in which it can deposit the piece it has gripped in a machine immediately downstream of the robot, wherein said equipment further comprises:
first machine-control means for controlling a first of said machines in said line, said first machine-control means being arranged to cause a cyclic movement of said movable device of said first machine between its inoperative position and its operative position at a predetermined, basic cycle frequency, machine-operation sensor means associated with each of said machines in said line for emitting a first signal each time a machine is at a predetermined point in its operating cycle, robot control means associated with each said robot in said line for starting an associated robot and for causing the gripping member of said robot to move cyclically from a rest position to said first position, from said first position to said second position and from said second position back to said rest position in a working cycle which is in phase with the operating cycle of the machine immediately upstream of said robot, said robot control means being enabled to start the associated robot in response to said first signal by the said machine-operation sensor means associated with a machine immediately upstream of said robot.

robot-operation sensor means associated with each said robot in said line for emitting a second signal each time the gripping member of an associated robot is at a predetermined point in its working cycle, and further machine control means associated with each machine downstream of said first machine in said line for starting a cyclic movement of the movable device of an associated machine between its operative position and its inoperative position, said further machine control means being enabled to start the associated machine in response to said second signal by the robot-operation sensor means associated with a robot immediately upstream of that associated machine, so that the operating cycle of each machine downstream of said first machine is in phase with the working cycle of the robot immediately upstream thereof and the operating cycles of each machine downstream of said first machine and the working cycles of each said robot are governed in cascade by the basic cycle frequency of said first machine.

2. Equipment as claimed in claim 1, wherein each said robot-control means controls the starting of the associated robot with a predetermined delay after the machine immediately upstream of that robot has reached the predetermined point in its cycle.

3. Equipment as claimed in claim 1, wherein each said further machine control means controls the starting of each machine downstream of said first machine with a predetermined delay after the robot immediately upstream of that machine has reached the predetermined point in its working cycle.

4. Equipment as claimed in claim 1, wherein each sensor means associated with each machine is arranged to detect the reaching of a second point and of a third point in the cycle of that machine and these points are used as references for avoiding collisions of that machine with the robot immediately downstream of that machine when the robot arrives at its first working position at the machine and when the movable device of the machine moves towards its operative position.

5. Equipment as claimed in claim 1, wherein each sensor means associated with each robot is arranged to detect the reaching of at least one further point in the working cycle of that robot and said at least one further point is used as a reference for avoiding collisions of the robot with the upstream machine and with the robot immediately upstream thereof.

6. A method for controlling operation of a line including a plurality of machines, particularly presses, which are intended to perform a succession of operations on individual pieces which are advanced along the line, from an upstream machine to a machine immediately downstream thereof, the line also including a plurality of programmable manipulator robots interposed between each upstream machine and the machine immediately downstream for transferring each of the pieces from said upstream machine to the machine immediately downstream, such that each said robot is immediately downstream of its upstream machine and immediately upstream of its machine immediately downstream, each of said machines having a movable device in combination therewith which is movable between an operative position for carrying out a certain operation on a piece situated in the machine and an inoperative position in which a piece to be worked can be deposited in the machine or a piece worked by the machine can be picked up; each manipulator robot including a gripping member which is movable between a first position in which it can grip a piece situated in a machine immediately upstream of the robot and a second position in which it can deposit the piece it has gripped in a machine immediately downstream of the robot, wherein said method comprises the following steps:
causing a cyclic movement of the movable device of a first machine in the line between its inoperative position and its operative position t a predetermined, basic cycle frequency, producing a first signal each time each machine in the line is at a predetermined point in its operating cycle, starting each manipulator robot in response to said first signal corresponding to the reaching of the predetermined point in the operating cycle of a machine immediately upstream of the manipulator robot, moving the gripping member of the manipulator robot cyclically from its rest position to its first position, from its first position to its second position and from its second position back to its rest position in an operating cycle which is in phase with the operating cycle of a machine immediately upstream of the manipulator robot, emitting a second signal each time the gripping member of a given manipulator robot is at a predetermined point in its cycle, and starting a cyclic movement of the movable device of each machine between its operative position and its inoperative position in response to said second signal corresponding to the reaching of the predetermined point in the operating cycle of a robot immediately upstream whereby the operating cycle of each machine downstream of the first machine is in phase with the operating cycle of the robot immediately upstream and the operating cycles of each said machine downstream of said first machine and the working cycles of each said robot are governed in cascade by the basic cycle frequency of said first machine.

* * * * *